United States Patent [19]

Orthey

[11] Patent Number: 5,325,591
[45] Date of Patent: Jul. 5, 1994

[54] BRANCH PRUNING SHEARS

[75] Inventor: Gebhard Orthey, Nauroth, Fed. Rep. of Germany

[73] Assignee: Wolf-Gerate GmbH, Fed. Rep. of Germany

[21] Appl. No.: 921,291

[22] Filed: Jul. 23, 1992

[30] Foreign Application Priority Data

Jul. 23, 1991 [DE] Fed. Rep. of Germany ....... 9109070

[51] Int. Cl.⁵ .................. B26B 13/00; B26B 13/26
[52] U.S. Cl. ........................................ 30/252; 30/250
[58] Field of Search .............. 30/252, 245, 250, 211, 30/191, 244, 251, 249, 242

[56] References Cited

U.S. PATENT DOCUMENTS 1,704,313  3/1929  Daniel ...................... 30/252
1,716,257  6/1929  Blodgett .................... 30/252
2,262,645  11/1941 Newman .................... 30/250
2,287,303  6/1942  Habart et al. .............. 30/252
2,513,038  6/1950  Merkur ..................... 30/250

FOREIGN PATENT DOCUMENTS 0421108  8/1990  European Pat. Off. .
 601564  5/1948  United Kingdom .......... 30/252

Primary Examiner—Richard K. Seidel
Assistant Examiner—Paul M. Heyrana, Sr.
Attorney, Agent, or Firm—Ostrolenk, Faber, Gerb et al.

[57] ABSTRACT

The pruning shears have a link pivotally connecting the force-lever arm of the cutter with the tang and a strap bridging the cutter and tang. In this way, the tilting movement, to which the joints are otherwise exposed, is counteracted by the strap.

8 Claims, 1 Drawing Sheet

BRANCH PRUNING SHEARS

BACKGROUND OF THE INVENTION

1. Field of the Invention

The present invention relates to pruning shears having a cutter with a cutting lever articulated thereon. On a force lever arm, which includes the cutter, there is provided a gripping handle and the load lever arm includes a tang pivoted via another joint. On the tang there is provided another gripping handle. The force lever arm of the knife is connected to the tang by a link which is pivoted via joints.

2. Description of the Prior Art

In pruning shears which are frequently subjected to high forces, there is the danger that, as a result of the clearance necessary for technical reasons between the pivot hole and the pivot pin, the joint, together with the part pivoted to it, will tilt apart to a greater or lesser extent depending on the tolerance. This angular deviation between the axis of the hole and the axis of the joint results in the separation of the cutter and tang, which are placed obliquely with respect to the cutting lever. This can lead to a jamming of the shears since the pivot heads rub in a precise manner against their resting surfaces. Furthermore, this angular displacement leads to an elongation of the pivot pins, which are thereby subjected to an unnecessarily strong load.

SUMMARY OF THE INVENTION

The object of the present invention is to avoid oblique separation between the cutter and tang and, by reducing the friction, decrease the force expended upon the cutting.

This object is achieved by providing a strap bridging the cutter and tang.

By the application of the strap, the axes of the hole and pivot are merely shifted parallel to each other by the tolerance of the fit and cannot be tilted with respect to each other. In this way, less frictional losses result and thus less expenditure of force during the cutting. Furthermore, the danger of a skew cut upon the cutting of the of branches is substantially less. Additional resting surfaces in the holes of the strap result in a smaller hole intrados and accordingly less wear.

In accordance with one development of the invention, all joints consist of joint bushings and joint bolts which are screwed together. Their heads are of oval shape and this flat oval shape of the head prevents the shears from catching among the branches upon cutting. As compared with the raised, sharp-edged ordinary pruning elements this constitutes a considerable contribution to the ease of the work and avoids damage to the bark of the tree. At the same time, a reduction in weight is obtained by this type of threaded joint.

In accordance with a further development of the invention, the user is afforded the possibility of readjusting the joint himself when necessary, which can be done with a single allen wrench.

Further features of the invention will become apparent from the following description which refers to the accompanying drawings.

BRIEF DESCRIPTION OF THE DRAWINGS

One embodiment of the invention will be described below with reference to the drawing, in which.

DESCRIPTION OF AN EMBODIMENT OF THE INVENTION

Figure 2:
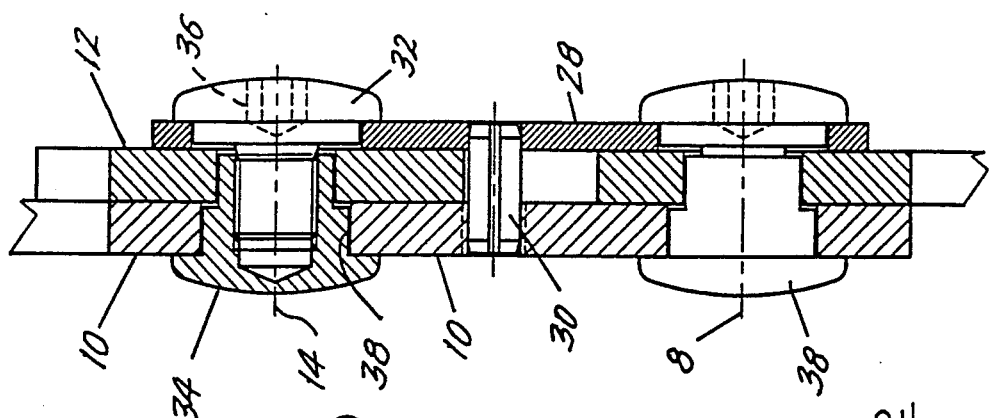
FIG. 2 is a cross-sectional view along the line A-D of FIG. 1.

The pruning shears have a cutting lever 10 and a cutter 12 cooperating with it. Cutting lever 10 and cutter 12 are swingably connected to each other by a shear joint along the axis 14. The cutting lever ends in a shank 16 on which a gripping handle is placed. Via another swivel joint in the swivel-joint axis 18, a tang 20 is pivoted to the cutting lever 10, on which tang another gripping handle can be placed. A link 22 has one end pivoted, via a swing joint 24, to the force-lever arm of the cutter 12 while its other end is pivoted via a swivel joint 26 to the tang 20.

Figure 1:
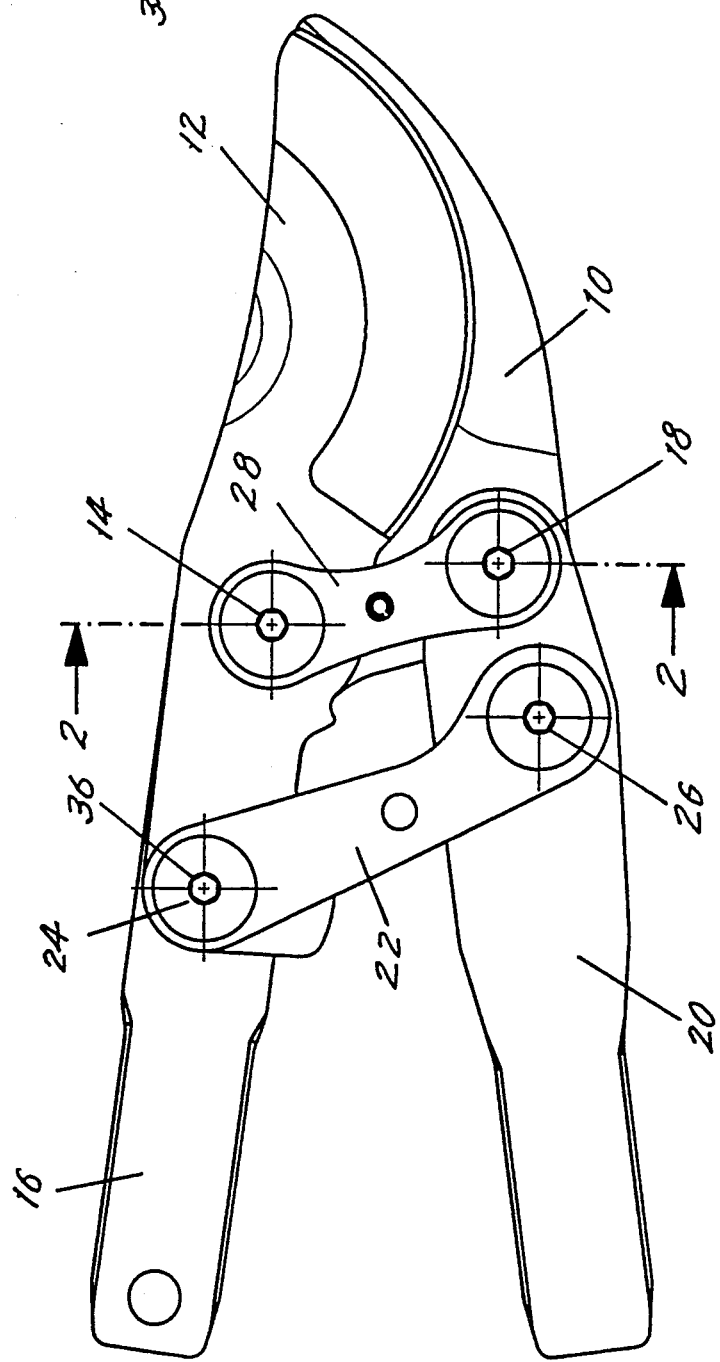
FIG. 1 is a side view of the pruning shears developed in accordance with the invention.

The shears operate as follows:

Upon the spreading of the gripping handles the mouth of the shears is opened, the link swinging the cutter 12 in counterclockwise direction around the axis 14 from the position shown in FIG. 1, while at the same time the cutting lever 10 is turned in clockwise direction around the axis 14. The closing movement of the shears is effected by the opposite movements. Upon cutting, a lateral force is exerted on cutting lever 10 and cutter 12, which force tends to tilt the parts with respect to each other, i.e. the cutter 12 moves away to one side and carries out a tilting movement with respect to the axis 14 or together with it, while the tang is swung in the opposite direction and tries to tilt the axis 18. In order to prevent this, a strap 28 is provided, which acts on the joints 14 and 18. As can be noted from FIG. 2, this strap 28 is connected via the threaded connection of joint bolt 32 with collar and joint bushing 34 to the cutting lever 10. A dowel pin 30 extends through the free space between the cutter 12 and tang 20 and acts as a stop.

The joints 14, 18, 24, 26 are formed by joint bolts 32 and joint bushings 34 which are screwed into each other and the flat oval heads of which act on the parts which are swingably attached to each other. One of the oval heads of each joint, or else both oval heads, is provided with a hexagon socket 36, in order to be able to regulate the tension of the corresponding joint. In order to prevent the joint bushing from turning upon the insertion of an allen wrench into the hexagon socket 36 of the joint bolt 32, the bushing has a polygonal shape on the outside, for instance in the form of a square 38, and is inserted, fixed against rotation, in a corresponding square hole in the cutting lever 10 and/or cutter 12 and/or tang 20.

By the provision of the strap 28, the axes 14 and 18 are shifted parallel to each other by elongation of the elements under the action of force, but they are no longer placed at an angle to each other so that a smooth cut is assured, even under the action of a high force.

I claim:

1. Pruning shears comprising:
    a cutter and a cutting lever pivotally connected to the cutter by a first joint, the cutting lever arm including a gripping handle;
    a tang pivotally connected tot he cutting lever by a second joint, another gripping handle being arranged on said tang, the cutter being pivotally connected to the tang via a link; and
    a strap extending between the first and second joints and bridging the cutter and tang to prevent the cutter and tang from tilting apart during cutting, wherein the strap is connected to the cutting lever via a dowel pin which extends between the tang and the cutter and acts as stop.

2. Pruning shears according to claim 1, wherein the strap under initial tension rests against a side of the cutter and the tang, each said side facing away from the cutting lever.

3. Pruning shears according to claim 1, wherein the first and second joints are formed of joint bolts and joint bushings which are threaded together, the bolts and bushings each having a widened head which, under initial stress, lies against the respective cutter, cutting lever or tang to be connected.

4. Pruning shears according to claim 3, wherein the joint bolts and joint bushings each have a flat oval head.

5. Pruning shears according to claim 3, wherein the head of the joint bolts has a hexagonal shaped socket.

6. Pruning shears according to claim 5, wherein the joint bushings each have a square end which is fixed, secured against rotation, in the respective cutting lever, cutter and/or tang.

7. Pruning shears according to claim 3, wherein the link is pivoted by joints provided on the cutter and the tang.

8. Pruning shears according to claim 7, wherein the links joints are formed of joint bolts and joint bushings which are threaded together, the bolts and bushings each having a widened head, which, under initial stress, lies against the respective cutter, cutting lever or tang to be connected.

* * * * *